(12) United States Patent
Spielman et al.

(10) Patent No.: US 7,668,919 B2
(45) Date of Patent: *Feb. 23, 2010

(54) SCALABLE IP-BASED NOTIFICATION ARCHITECTURE FOR UNIFIED MESSAGING

(75) Inventors: Brenda Gates Spielman, Charlottesville, VA (US); Lewis Dean Dodrill, Richmond, VA (US); Satish Joshi, Glen Allen, VA (US); Nagendran Parasu, Richmond, VA (US); Robert James Lockwood, Richmond, VA (US)

(73) Assignee: Cisco Technology, Inc., San Jose, CA (US)

( * ) Notice: Subject to any disclaimer, the term of this patent is extended or adjusted under 35 U.S.C. 154(b) by 1052 days.

This patent is subject to a terminal disclaimer.

(21) Appl. No.: 11/069,961

(22) Filed: Mar. 3, 2005

(65) Prior Publication Data

US 2005/0177622 A1 Aug. 11, 2005

Related U.S. Application Data

(63) Continuation of application No. 09/629,051, filed on Jul. 31, 2000, now Pat. No. 6,874,011.

(51) Int. Cl.
*G06F 15/16* (2006.01)
(52) U.S. Cl. .................. 709/206; 709/230; 370/465
(58) Field of Classification Search .......... 709/203, 709/206, 214
See application file for complete search history.

(56) References Cited

U.S. PATENT DOCUMENTS

| 4,837,798 A | 6/1989 | Cohen et al. |
| 5,717,741 A | 2/1998 | Yue et al. |
| 5,742,905 A | 4/1998 | Pepe et al. |
| 5,758,088 A | 5/1998 | Bezaire et al. |
| 5,764,747 A | 6/1998 | Yue et al. |
| 5,790,790 A | 8/1998 | Smith et al. |
| 5,802,312 A | 9/1998 | Lazaridis et al. |
| 6,226,668 B1 | 5/2001 | Silverman |

(Continued)

*Primary Examiner*—Ario Etienne
*Assistant Examiner*—Uzma Alam
(74) *Attorney, Agent, or Firm*—Leon R. Turkevich; Edward J. Stemberger

(57) ABSTRACT

A notification architecture utilizes multiple processes configured for managing notification operations based on reception of SMTP-based messages within IMAP based message stores. The notification architecture enables use of multiple instances of a notification process, each configured for receiving notification messages for respective subscribers from messaging sources according to a prescribed open protocol such as Internet Protocol. Each notification process accesses subscriber profile information from an open protocol-based subscriber directory based on the received notification messages. Each notification process determines, for each received notification message, the subscriber's notification preference based on the accessed profile information, and selectively outputs a notification delivery message according to a prescribed open protocol to at least one notification delivery process within the notification architecture based on the subscriber's notification preference. Each notification process may have access via the prescribed open protocol to multiple notification delivery processes, each configured for outputting a notification to a subscriber's notification device according to a corresponding device protocol. Multiple instances of each type of notification delivery process may also be utilized for increased capacity. Hence, subscribers may be notified of events according to their respective preferences, including subscriber device type, or time of notification. Moreover, the notification architecture can be scaled without adversely affecting any existing instances of the notification process or the notification delivery processes.

48 Claims, 6 Drawing Sheets

U.S. PATENT DOCUMENTS

| | | |
|---|---|---|
| 6,256,666 B1 | 7/2001 | Singhal |
| 6,393,483 B1 | 5/2002 | Latif et al. |
| 6,438,585 B2 | 8/2002 | Mousseau et al. |
| 6,463,464 B1 | 10/2002 | Lazaridis et al. |
| 6,560,318 B1 | 5/2003 | Spielman et al. |
| 6,665,378 B1 | 12/2003 | Spielman et al. |
| 6,671,355 B1 | 12/2003 | Spielman et al. |
| 6,874,011 B1 * | 3/2005 | Spielman et al. ............ 709/206 |

* cited by examiner

SCALABLE IP-BASED NOTIFICATION ARCHITECTURE FOR UNIFIED MESSAGING

This is a continuation of application Ser. No. 09/629,051 filed on Jul. 31, 2000 now U.S. Pat. No. 6,874,011.

BACKGROUND OF THE INVENTION

1. Field of the Invention

The present invention relates to message notification systems configured for sending a notification message to a subscriber having received a message.

2. Description of the Related Art

The evolution of the public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure.

For example, existing messaging systems such as voice mail messaging systems rely on a proprietary notification system that has limited adaptability to expanded notification schemes. For example, the simplest type of notification system involves a message waiting indicator on a telephone connected to a private branch exchange (PBX), where the PBX asserts a message waiting indicator signal in response to receiving a proprietary command from a connected voice mail system. A more advanced system may initiate a page to a subscriber's pager indicating reception of the stored voice message. In each of these cases, however, the notification process necessarily relies on the proprietary features of the PBX and the associated voice mail system.

Wireless based communications system have voice messaging systems that notify a wireless subscriber via his or her wireless telephone of a stored voicemail message. Such notification systems are beneficial in cases where the subscriber was making another call on his or her wireless telephone, or if the subscriber's wireless telephone was previously unavailable due to being turned off or outside a service area. Such wireless based communications systems, however, rely on the proprietary features of the wireless indications system in order to notify the wireless subscriber.

Short Message Services (SMS) have been implemented in wireless telephone communications systems as a way to send a message to a subscriber's cellular phone to notify the subscriber that he or she has received a new voice mail. A messaging server, also referred to as a Short Message Service Center (SMSC), is configured for receiving a notification message from a messaging source according to Short Message Peer to Peer Protocol (SMPP). The messaging source may be, for example, a voice mail system, a paging system, or an e-mail interface resident within the wireless telephone communications system. The SMSC, in response to receiving the notification message from the mess aging source, transmits a short message to the cellular phone based on the destination telephone number specified within the notification message. However, this arrangement still provides only limited flexibility in enabling different sources to send a notification to a cellular phone. Hence, the above-described arrangement still lacks sufficient flexibility and scalability to enable messaging subscribers to select the means for notification.

Unified communications systems are under development as a way of enhancing messaging services for users such as wireless telephone subscribers. A disadvantage of unified communications systems implemented as enhanced versions of the voice mail system, paging system, or e-mail interface resident within the wireless telephone communications system is that such implementation requires detailed knowledge of the proprietary protocols associated with the voice mail systems. Hence, such implementations are available only from switch vendors having knowledge of the proprietary protocols.

Use of a unified communications system implemented independent of the existing proprietary voice mail systems enables service providers to use scalable and distributed systems using recognized communication protocols. Hence, the service providers may use such unified communications systems across multiple platforms, independent of protocol, for storage of various types of messages, for example voice messages, facsimile, and e-mail stored in a centralized messaging store. However, the problem still remains that there exists several different types of notification devices, such as a pager, a phone indicator light, stutter dial tone, facsimile, and telephone. Moreover, for each message that enters a messaging store, one or more subscribers may need to be notified over one or more different notification devices.

Another concern in developing effective unified messaging and notification systems is the scalability of the system. In particular, deployment of a given notification system may be limited if the notification system needs to be duplicated with multiple systems that introduce inefficiencies in the deployed system. Hence, the notification system may not be feasible in Enterprise and Solution provider systems unless the system has features that enable scalability by duplicating resources without introducing inefficiencies.

SUMMARY OF THE INVENTION

There is a need for an arrangement that provides a scalable open standards-based architecture for delivering notification for unified messaging systems over a broad range of notification devices.

There also is a need for an arrangement that provides a scalable notification architecture that can provide notification to subscribers via subscriber-selected devices according to subscriber-selected notification requirements.

These and other needs are attained by the present invention, where a notification process, configured for receiving notification messages for respective subscribers from messaging sources according to a prescribed open protocol such as Internet Protocol, accesses subscriber profile information from an open protocol-based subscriber directory based on the received notification messages. The notification process determines, for each received notification message, the subscriber's notification preference based on the accessed profile information, and selectively outputs a notification delivery message according to a prescribed open protocol to at least one notification delivery process based on the subscriber's notification preference. The notification process may have access via the prescribed open protocol to multiple notification delivery processes, each configured for outputting a notification to a subscriber's notification device according to a corresponding device protocol. In addition, the notification process or any one of the notification delivery processes may be duplicated for large-scale deployment, merely by adding a corresponding process able to receive messages, and registering the new process with the relative sources for the new process, enabling the new process sources to begin sending messages to the new process according to the open protocol. Hence, scalable notification system may be deployed where subscribers may be notified of events according to their respective preferences, including subscriber device type, or time of notification.

One aspect of the present invention provides a notification method. The method includes obtaining a notification message having been sent from a notification source according to a first open network protocol, the notification message specifying at least one notification recipient and notification information. The method also includes accessing a subscriber directory, according to a second open network protocol, for subscriber attribute information specifying subscriber notification preference for the specified at least one notification recipient, generating, based on the subscriber notification preference, a notification delivery message that specifies a destination address of a corresponding notification device for the notification recipient and at least a corresponding selected portion of the notification information, and outputting, according to a third open network protocol, the notification delivery message to a selected corresponding one of a plurality of notification delivery processes for delivery of the selected portion of the notification information to the notification device according to a corresponding device protocol. The notification delivery processes include a group of duplicate processes each configured for sending the notification information to the notification device according to the device protocol. Consequently, the outputting step includes selecting one of the duplicate processes as the selected one notification delivery process. Outputting the notification delivery message according to the third open network protocol enables any multiple number of duplicate processes to be used for sending notification information according to a device protocol. Hence, the notification method can be deployed on a large scale for a large number of user devices, merely by selecting one of the duplicate processes as the selected one notification delivery process.

Another aspect of the present invention provides a method for deployment of a notification system for a notification source. The method includes the steps of initiating multiple notification processes and multiple notification delivery processes. Each notification process is configured for retrieving according to a first open network protocol a corresponding notification message from a corresponding primary message store. Each notification message specifies at least one corresponding notification recipient and corresponding notification information, and each notification process is configured for accessing a subscriber directory according to a second open network protocol for subscriber notification preference information for the at least one corresponding notification recipient and in response generating a corresponding notification delivery message that specifies a destination address of the corresponding notification device. Each notification delivery processes is configured for retrieving according to a third open network protocol a corresponding received notification delivery message from a corresponding secondary message store and supplying a corresponding notification to a subscriber device according to a corresponding device protocol based on the corresponding received notification delivery message. The method also includes first providing each of the multiple notification processes destination address information for providing the notification delivery messages to the secondary message stores, and second providing the notification source with destination address information for providing the notification messages to the primary message stores. Use of multiple notification processes and multiple notification delivery processes enables the task of generating notification delivery messages and supplying notifications to subscriber devices to be distributed across multiple servers, where each server may be configured for executing any one or a number of processes. Moreover, the providing of the destination address information to the notification processes and the notification source enables the notification system to be easily expanded, since each messaging source merely needs to be aware of the existence of the appropriate message store location for transfer of the corresponding message to the added process transfer according to the open standards protocol. Hence, the notification system can be scaled in capacity merely by starting another instance of the target process, and identifying for the processes generating the messages the mailbox address of the target process by registering the mailbox address with the processes generating the messages.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The disclosed embodiment is directed to an arrangement for providing a scalable unified notification system, plus the methodology of increasing capacity in the unified notification system by utilizing open network protocols for interprocess communications. A description will first be provided of the notification architecture that utilizes open network protocols, followed by a description of the method of deploying the notification system to provide a scalable unified notification system.

Figure 1:
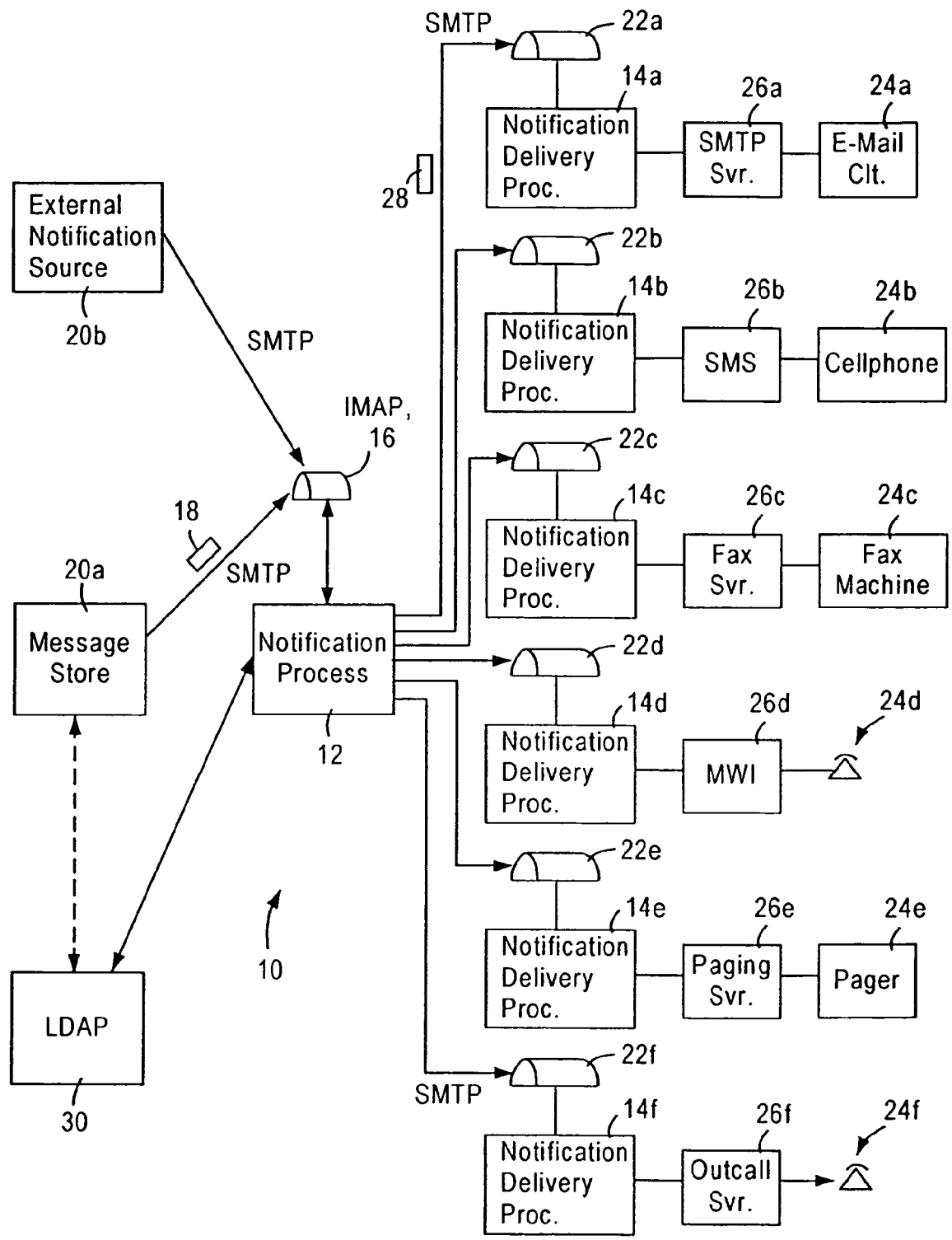
FIG. 1 is a block diagram illustrating deployment of a notification system for use with a unified messaging system according to an embodiment of the present invention.

FIG. 1 is a block diagram illustrating an architecture that provides unified notification services via an IP network according to an embodiment of the present invention. The notification system 10 includes a notification process 12 and multiple notification delivery processes 14. The notification process 12 has an associated SMTP-based mailbox 16, also referred to as the primary mailbox, configured for receiving generic notification messages 18 from notification sources 20, such as a unified messaging system 20a or an external notification source 20b. An exemplary implementation of the unified messaging system 20a is the commercially available Cisco Unified Open Network Exchange (Cisco uOne) (Products UONE-FOUND 4.1S, and UONE-VOICEMSG 4.1S) from Cisco Systems, Inc. An example of the external notification source 20b may be an e-mail server configured for automatically generating e-mail messages in response to a prescribed detected events, for example execution of a prescribed stock transaction, shipment of a customer order, etc.

Each notification delivery process 14 also has a corresponding SMTP based mailbox 22, referred to as a secondary mailbox, configured for receiving a corresponding notification delivery message 28. As described in detail below, each SMTP based mailbox 22 is configured for receiving according to SMTP protocol a corresponding notification delivery message 28 that specifies selected notification information to be utilized for notification according to a corresponding device-specific protocol. Although the notification delivery message 28 is typically sent by the notification process 12 according to accessed subscriber notification preferences, described below, the notification delivery message 28 may also be sent independently by the external notification service 20b if properly configured to supply the appropriate notification information according to the device-specific protocol.

Each notification delivery process 14 is configured for delivering a notification to a subscriber's notification device 24, according to a corresponding device protocol, based on reception of a notification delivery message 28 in its corresponding mailbox 22. For example, the notification delivery process 14a is configured for sending an SMTP-based notification to an e-mail client 24a using an SMTP server 26a for distribution of the selected notification information according to the protocol of the e-mail client 24a. Similarly, the notification delivery process 14b is configured for outputting an SMS-based message to the SMS server 26b for delivery to the subscriber's cellphone 24b. The notification delivery process 14c is configured for sending an outgoing facsimile transmission to a subscriber's fax machine 24c using a fax server 26c, and the notification delivery process 14d is configured for sending a command to the message waiting indicator server 26d for asserting a message waiting light on a subscriber's telephone 24d. The notification delivery process 14e is configured for sending a paging command to a paging server 26e for delivery of a wireless page to a subscriber's pager 24e, and the notification delivery process 14f is configured for requesting an outgoing call server 26d, for example a PBX or a voice over IP call controller, to place an outgoing call to a subscriber's telephone 24f used for notification (e.g., a home telephone or a secretary's telephone) in order to notify the subscriber of the event specified in the notification delivery message 28.

The notification process 12 is configured for outputting at least one notification delivery message 28 to a corresponding selected secondary mailbox 22 for delivery of a notification to the selected notification device 24 according to the corresponding protocol. In particular, the notification process 12 regularly polls the primary mailbox 16 for received messages from the message store 20a or the external notification service 20b, and obtains the notification messages according to IMAP protocol. According to the disclosed embodiment, the message store 20a outputs a notification message to the primary mailbox 16 for each message received by the message store 20. The notification message 18, illustrated in FIG. 2, specifies at least one notification recipient and notification information.

The notification process 12 generates the notification delivery message 28 and selects the notification delivery process 14 for delivery of notification information to the corresponding selected notification device 24 based on accessing subscriber attribute information that specifies the subscriber's notification preferences. In particular, the notification process 12, in response to detecting a notification message in the primary mailbox 16, accesses a subscriber directory according to LDAP protocol for retrieval of subscriber attribute information for each notification recipient specified in the notification message 12.

In particular, the notification process 12 will determine, for each notification recipient specified in the notification message 18, whether the notification recipient is a notification subscriber (i.e., subscribes to the notification service), and the subscriber notification preferences for the notification recipient. For example, the subscriber notification preferences may specify that the notification subscriber prefers an e-mail notification at a first prescribed time, an SMS based message at a second prescribed time, and a message waiting indicator (MWI) at all times. Note that the prescribed times for different notification devices may overlap, causing the notification process 12 to generate multiple device-specific notification delivery message 28 for a single notification message 18.

Figure 2:
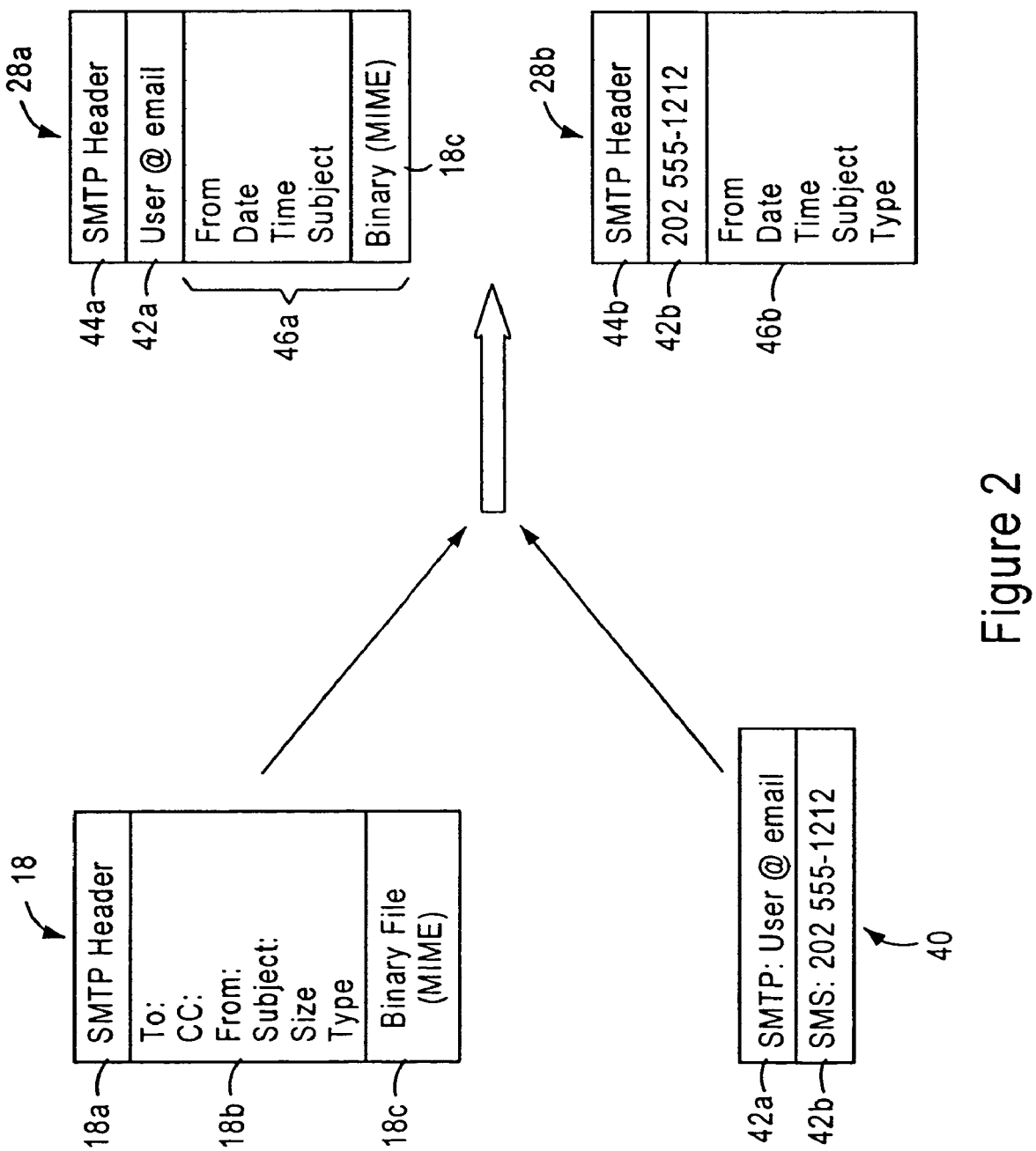
FIG. 2 is a diagram illustrating the generation of a notification delivery message by the notification process of FIG. 1 using selected portions of notification information and retrieved subscriber notification preference information according to an embodiment of the present invention.

FIG. 2 is a diagram illustrating the generation of a notification delivery message 28 by the notification process of FIG. 1. The notification process 12 retrieves the subscriber notification preferences 40 from the LDAP directory 30, for example the destination addresses 42 of the corresponding notification devices to be used for notification. For example, the subscriber notification preferences 40 include key value pairs that specify an e-mail address 42a for the e-mail client 24a, and a cellular telephone number 42b of the subscriber's cellphone 24b for SMS notification by the SMS server 26b.

Upon retrieval of the subscriber notification preferences 40, the notification process 12 generates at least one notification delivery message 28 that specifies the destination address 42 of a corresponding notification device 24 for the notification recipient, and at least a corresponding selected portion 46 of the notification information. In particular, the notification process 12 extracts selected portions of notification information 18b, 18c from the notification message 18 based on the notification device specified by the subscriber notification preference, and inserts the selected portions of the notification information into the notification delivery message 28. Items that may be extracted from the received notification message 18 include: the sender's e-mail address, the sender's telephone number, the sender's name, the subject of the message, the priority of the message, the message type (e-mail, a fax, voice mail), the date and time of the message, the total size of the message, a text excerpt, and a MIME-encoded voice or fax attachment.

For example, the notification process 12 may generate the notification delivery message 28a for the notification delivery process 14a by including an SMTP header 44a that specifies the destination e-mail address of the secondary mailbox 22a, the subscriber information illustrated as the destination address 42a of the e-mail client 24a, and notification information 46a such as the source of the original message ("From"), date and time stamp, subject line, and a copy of the MIME encoded message attached as a binary file 18*c* in case the user wishes to play the message (in the case of a .wav file) or view the message (in the case of a .tiff file). In addition, the notification process 12 may generate a notification delivery message 28*b* for the notification delivery process 14*b* by including an SMTP header 44*b* that specifies the destination e-mail address of the secondary mailbox 22*b* the subscriber information illustrated as the telephone number of the cellphone 24*b*, and notification information 46*b* such as the source of the original message ("From"), date and time stamp, subject line, and message type. Note that the contents of the notification information 46*b* differs from the contents of the notification information 46*a* based on the relative capabilities of the notification devices 24*b* and 24*a*. Hence, the notification process 12 selects the notification information based on the capabilities of the notification device.

Figure 3:
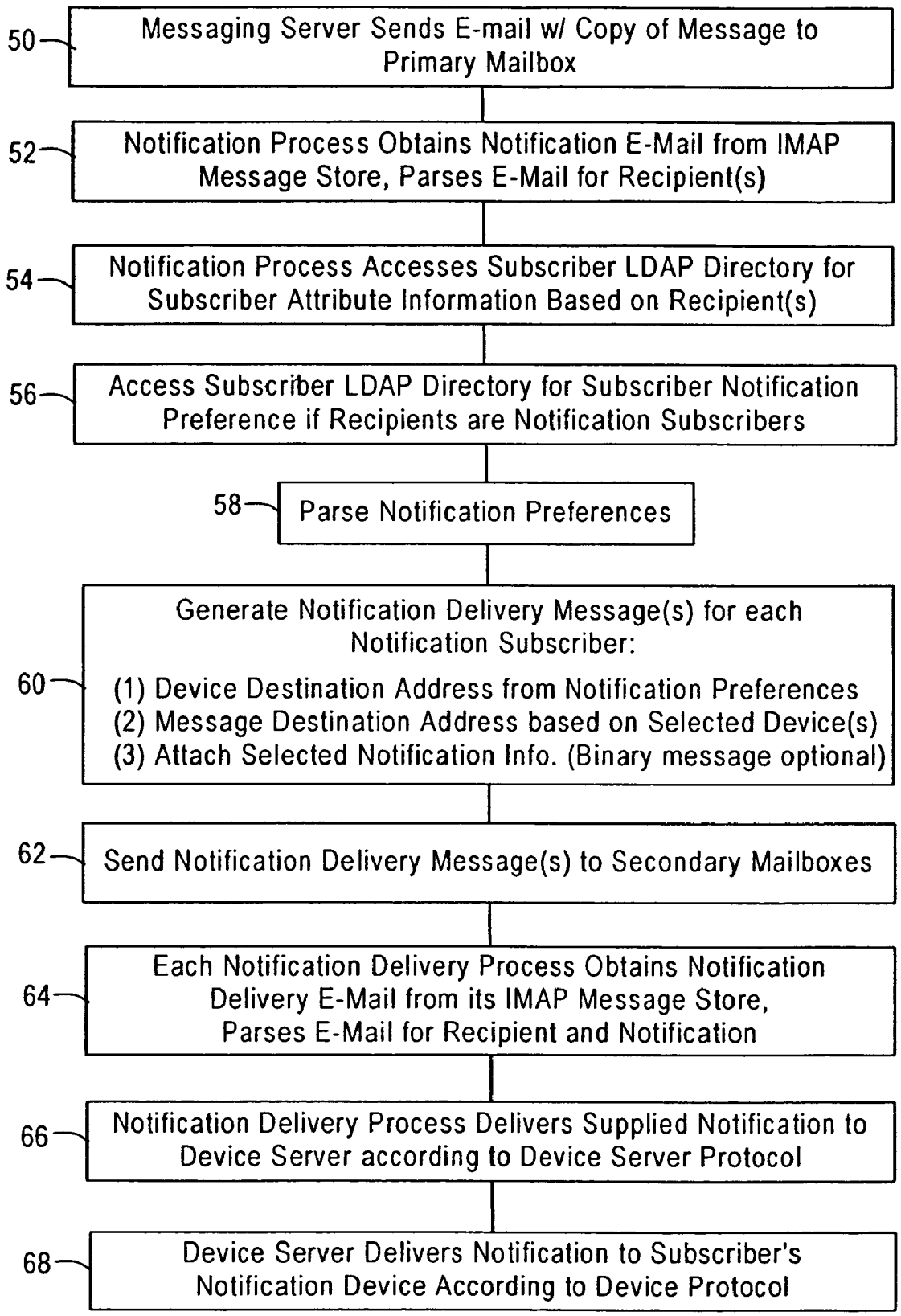
FIG. 3 is a diagram illustrating the notification method of the notification system of FIG. 1 according to an embodiment of the present invention.

FIG. 3 is a diagram illustrating the notification method by the notification system 10 according to an embodiment of the present invention. The steps described in FIG. 3 can be implemented as executable code stored on a computer readable medium (e.g., a hard disk drive, a floppy drive, a random access memory, a read only memory, an EPROM, a compact disc, etc.). In addition, the notification process 12 and the notification delivery processes 14 may be implemented as executable routines within a single server, or distributed across multiple servers.

In addition, the disclosed architecture has the advantage that each of the processes 12 and 14 are scalable across multiple servers for large-scale deployment as multiprocess systems, where each process communicates with another process by sending SMTP-based messages. For example, multiple notification processes 12 may be arranged to serve respective groups of subscribers, where a first notification process (e.g., 12*a*) forwards a received notification message 18 to the primary mailbox 16 of a second notification process (e.g., 12*b*) if the first notification process 12*a* does not serve the subscriber specified in the received notification message.

As shown in FIG. 3, the method begins in step 50 by the messaging server 20*a* or the external notification source 20*b* by sending the notification message 18 with a copy of the stored message (shown in FIG. 2 as portions 18*b* and 18*c*) to the primary mailbox 16 of the notification process 12. The notification process 12 regularly polls the primary mailbox 16, implemented within the IMAP message store, and obtains the notification message 18 in step 52 according to IMAP protocol and parses the notification message 18 for the notification recipients.

Upon identifying the notification recipients from the notification message 18, the notification process 12 accesses the subscriber LDAP directory 30 in step 54 to determine whether the notification recipients are valid notification subscribers. If the notification recipients are valid notification subscribers, the notification process 12 accesses the subscriber LDAP directory 30 in step 56 for the subscriber notification preferences 40 and all parameters associated with the device protocols to enable notification to the identified user device 24. If any notification recipient is not a valid notification subscriber, the process is dropped with respect to that notification recipient.

The notification process 12 parses the notification preferences 40 in step 58, and generates the notification delivery messages 28 for each notification subscriber in step 60. In particular, the notification process 12 determines for each notification device 24 the corresponding destination address 42, determines the message destination address for the corresponding secondary mailbox 22 based on the selected device, and attaches the selected notification information 46 based on the selected device. Typically the notification process 12 will access a local table that identifies the SMTP destination address for each of the secondary mailboxes 22. The notification process 12 then sends the notification delivery messages 28 to the secondary mailboxes 22 in step 62.

Each notification delivery process 14 periodically polls its corresponding secondary mailbox 22 according to IMAP protocol, and in step 64 obtains its corresponding received notification delivery message 28 and parses the notification delivery message 28 for the destination address information 42 and the notification information 46. The notification delivery process 14 then delivers the supplied notification 46 to the corresponding associated device server 26 according to the device server protocol in step 66. For example, the notification delivery process 14*a* would send an e-mail message for transmission by the SMTP server 26*a* that specifies the destination address 42*a* of the e-mail client 24*a* and the notification information 46*a* as an attachment to the e-mail. The notification delivery process 14*b*, however, would send an SMS message to the SMS message server 26*b* that specifies the destination address 42*b* of the cellphone 24*b* and the text based notification information 46*b* for display on the subscribers cellphone 24*b*. The device server 26 would then send the notification message in step 68 to the corresponding subscriber device 24 according to the device specific protocol.

If notification to a device 24 should fail, the notification delivery process 14 schedules and performs any number of retries to the device 24. For example, the information about the message and the subscriber that still needs to be notified may be written to disk, plus the time at which the next retries should occur. Hence, each delivery process 14 processes any new incoming IMAP messages, and processes any needed retries.

The disclosed notification architecture is built upon the open standards of Internet Message Access Protocol (IMAP), Lightweight Directory Access Protocol (LDAP), and Simple Mail Transfer Protocol (SMTP). Hence, the notification architecture can be made available on a large number of platforms, and can be built upon any number of IMAP compliant messaging stores and LDAP compliant directory stores. In addition, the number of overall LDAP lookups is minimized, since the notification process 12 obtains all necessary information at one time for each of the notification delivery processes 14. In addition, network traffic is minimized since each notification delivery process 14 can receive selected portions of the original stored message as needed, as opposed to a complete copy. Finally, the notification process 12 and each of the notification delivery processes 14 are accessible by any SMTP source by sending an SMTP based message with the appropriate notification information to the appropriate mailbox 16 or 22. Hence, the same notification system 10 can be utilized to support unified messaging services by the message store 20*a*, while providing added value for external notification services 20*b*.

Figure 4:
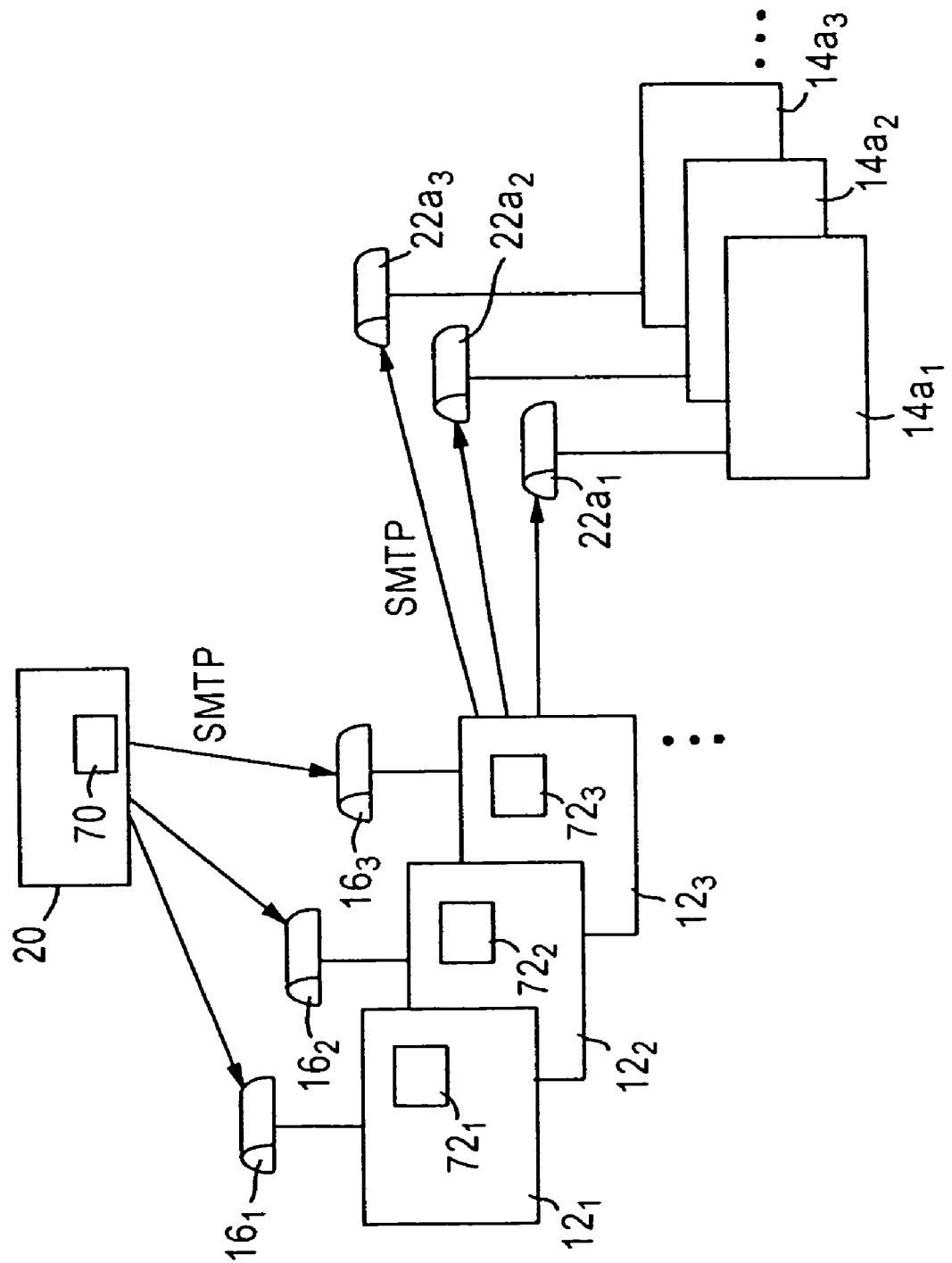
FIG. 4 is a diagram illustrating in further detail scaling the notification system of FIG. 1 by adding multiple notification processes and duplicate notification delivery processes according to an embodiment of the present invention.
Figure 5:
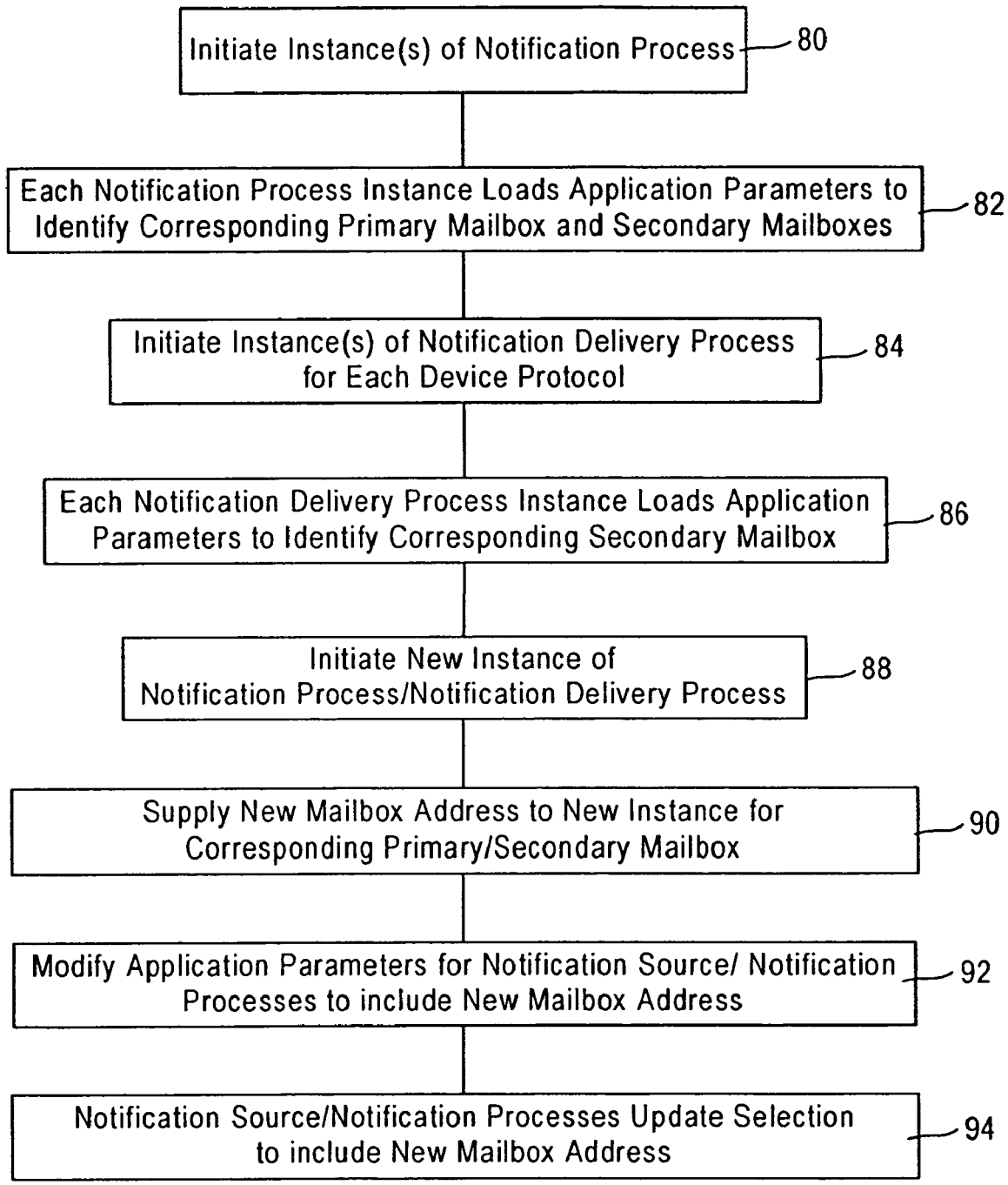
FIG. 5 is a diagram illustrating the method of deploying a scalable notification system according to an embodiment of the present invention.

FIGS. 4 and 5 describe in further detail the features of a scalable open standards based notification system according to an embodiment of the present invention. In particular, FIG. 4 is a diagram illustrating in further detail multiple instances of duplicate processes that are initiated to increase processing capacity, and FIG. 5 is a diagram illustrating the method of deploying a scalable open standards based notification system according to an embodiment of the present invention.

As illustrated in FIG. 4, the notification system 10 includes multiple instances of the notification process 12, and multiple instances of the notification delivery process 14*a* configured for supplying a notification to an e-mail client 24*a* according to the protocol of the SMTP server 26*a*. The notification processes $12_1$, $12_2$, $12_3$, etc. have primary SMTP based mailboxes $16_1$, $16_2$, $16_3$, etc. having respective mailbox addresses for receiving notification messages from a notification source 20 such as the message store 20a or the external notification source 20b according to SMTP protocol. The mailbox addresses of each of the primary mailboxes $16_1$, $16_2$, $16_3$, etc. are registered with each notification source 20 in its corresponding application parameters file 70, enabling each notification source 20 to output a notification message to any one of the notification processes 12. Since each instance of the notification process 12 operates independently, the notification processes 12 may be executed within a single server, or distributed among multiple servers. Hence, the operations of the notification process 12 can be scaled merely by creating a new primary mailbox having a prescribed address, initiating a new instance of the notification process 12 with application parameters that enable the new instance to access the new primary mailbox, and registering the mailbox addresses of the new primary mailbox with the configuration file 70 to enable the notification source 20 to send notification messages to the new instance.

Multiple instances of the notification delivery process 14a can be established in the same manner as for the notification process 12. In particular, The notification delivery processes $14a_1$, $14a_2$, $14a_3$, etc. have secondary SMTP based mailboxes $22a_1$, $22a_2$, $22a_3$, etc. having respective mailbox addresses for receiving notification delivery messages from any one of the notification processes 12 according to SMTP protocol. The mailbox addresses of each of the secondary mailboxes $22a_1$, $22a_2$, $22a_3$, etc. are registered with each notification process 12 in its corresponding application parameters file 72, enabling each notification process 12 to output a notification delivery message to any one of the notification delivery processes 14a. Each instance of the notification delivery process 14a operates independently, enabling execution within a single server, or distributed among multiple servers. Hence, the operations of the notification delivery process 14a can be scaled merely by creating a new secondary mailbox having a prescribed address, initiating a new instance of the notification delivery process 14 with application parameters that enable the new instance to access the new secondary mailbox, and registering the mailbox addresses of the new secondary mailbox with the configuration file 72 to enable the notification processes 12 to send notification delivery messages to the new instance.

FIG. 5 is a diagram illustrating the method of deploying an open standards based scalable notification system according to an embodiment of the present invention. The steps described in FIG. 5 can be implemented as executable code stored on a computer readable medium (e.g., a hard disk drive, a floppy drive, a random access memory, a read only memory, an EPROM, a compact disc, etc.). In particular, FIG. 5 illustrates an example where multiple instances of the notification process 12 and the notification delivery processes 14 are initiated, followed by addition of a new instance of either the notification process 12 or any one of the notification delivery processes 14 to provide scalability by increasing number of processes for increased processing capacity in the notification system 10.

The method begins in step 80, where one or more servers initiate instances of the notification process 12. Each instance of the notification process 12 loads during its initialization application parameters into its application runtime environment in step 82 to identify runtime attributes such as the identity of its corresponding primary mailbox 16, and the identity of the secondary mailboxes 22. In particular, each instance of the notification process 12 uses the identity of the corresponding primary mailbox 16 in order to access the received notification according to IMAP protocol. Each instance of the notification process 12 also uses the identity (i.e., mailbox address) of the secondary mailboxes 22 in order to identify available destinations for notification delivery messages.

The instances of the notification delivery processes 14 are then initiated by one or more servers in step 84 for each device protocol. For example, a server may initiate multiple instances (e.g., $14a_1$, $14a_2$, $14a_3$, etc.) of the notification delivery process 14a for SMTP-based notification. Each instance of the notification delivery process 14 also loads the corresponding application parameters into its application runtime environment to identify its corresponding secondary mailbox 22 for access of notification delivery messages according to IMAP protocol. At this point, the notification architecture 10 is able to deliver notifications to the user devices as described above with respective FIG. 3. At this point the notification source 20 already has loaded the mailbox addresses of the primary mailboxes 16 from its application parameters file 70 in order to begin SMTP based delivery of notification messages.

Assume now that there is a need to increase capacity of the notification architecture 10 by adding another instance of either the notification process 12 or any one of the notification delivery processes 14. The appropriate server initiates a new instance in step 88 of either the notification process 12, or one of the notification delivery processes 14 (or both). The appropriate server then supplies in step 90 the new mailbox address for the corresponding primary mailbox 16 or the secondary mailbox 22 to the application runtime environment of the new instance, for example by supplying the file containing application parameters as a command line argument.

The appropriate server then modifies in step 92 the application parameters file 70 or 72 for either the notification source 20 or the notification processes 12, based on whether the new mailbox address is for a primary mailbox 16 or a secondary mailbox 22, respectively. Note that is not necessary to halt either the notification source 20 or the notification processes 12, since each server periodically rereads the appropriate application parameters file 70 or 72, and updates the application runtime environment of the notification source 20 or the notification process 12 in step 94, enabling the updated processes to include the new mailbox address during selection of a destination mailbox for output of the corresponding message to SMTP protocol.

Figure 6:
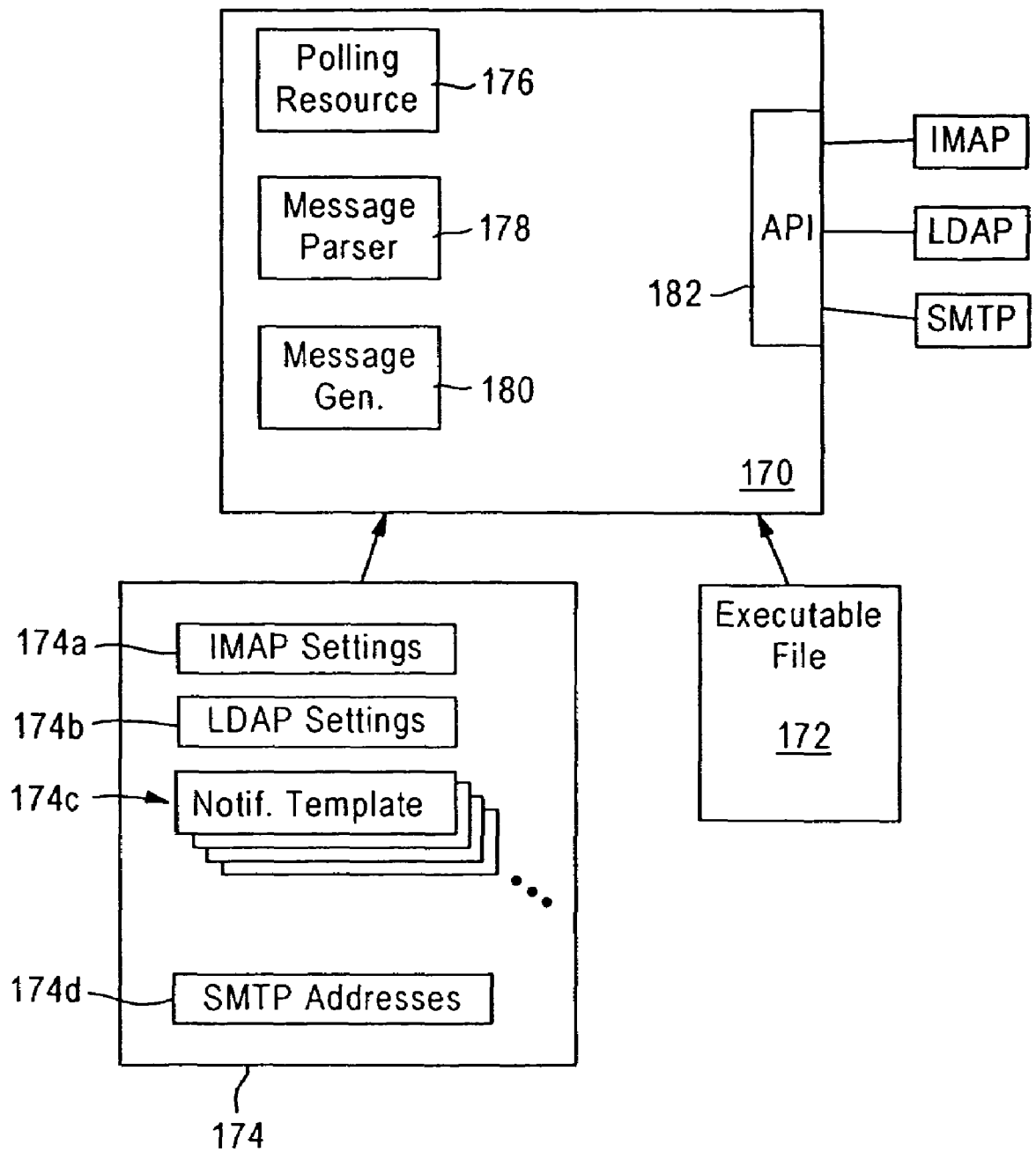
FIG. 6 is a diagram illustrating in detail the notification process of FIG. 1 according to an embodiment of the present invention

FIG. 6 is a diagram illustrating in detail the notification process 12 according to an embodiment of the present invention. The notification process 12 is implemented as an application runtime environment 170 that executes sequences of instructions (as described with respect to FIG. 3) loaded from a tangible medium 172, and based on context-specific information loaded from an initialization file 174 during initialization of the process 12. In particular, the initialization file 174 includes parameters such as IMAP information 174a for accessing the primary IMAP message store 16, LDAP settings 174b for accessing the LDAP directory 30, notification templates 174c that specify parameters for generating the notification delivery messages 28, and SMTP-based addresses 174d that identify the SMTP addresses of the secondary mailboxes 22.

As shown in FIG. 6, the application runtime environment 170 includes a polling resource 176 configured for issuing function calls at regular prescribed intervals for obtaining the notification messages 18 from the primary mailbox 16 according to IMAP protocol. The application runtime environment 170 also includes a message parser 178 configured for parsing the retrieved notification messages 18 for identification of the notification recipients.

The application runtime environment 170 also includes a message generator 180 configured for generating the notification delivery messages based on the subscriber notification preference information retrieved from the LDAP directory 30, and based on the notification information within the received notification message 18. The message generator 180 generates a notification delivery message 28 for a selected subscriber device 24 having selected portions of the notification information based on a corresponding protocol specific notification template 174c. In particular, the initialization file 174 includes a notification template 174c for each of the notification delivery processes 14: each notification template 174c specifies the relevant key-value pairs from the notification message 18 to be added to the notification delivery message 28 for the corresponding subscriber device 24. Hence, the message generator 180 utilizes a selected notification template 174c based on the subscriber device 24 specified in the subscriber notification preference information: if the subscriber preference specifies an e-mail client 24a, the message generator 180 utilizes an e-mail-specific template that specifies the key-value pairs of the notification information within the notification message 18 that should be included within the notification delivery message 28 to be sent to the secondary mailbox 22a; if the subscriber preference specifies an SMS-based client 24b, the message generator 180 utilizes an SMS-specific template that specifies the key-value pairs of the notification information within the notification message 18 that should be included within the notification delivery message 28 to be sent to the secondary mailbox 22b, etc. Hence, the message generator 180 is able to select portions of the notification information from the notification message 18 to be included in the notification delivery message 28 based on the subscriber device type 24 specified in the subscriber notification preference information.

The application runtime environment 170 also includes a set of libraries 182 that may be implemented as dynamically linked libraries (DLLs) or application programming interface (API) libraries. The libraries 182 enable the runtime environment 170 to implement procedure calls, such as issuing function calls to the IMAP directory 16 for retrieval of the notification messages 18, the LDAP directory 30 for retrieval of the subscriber notification preference information, and an SMTP server for sending the notification delivery messages 28.

According to the disclosed embodiment, and open standards based notification architecture provides scalability by enabling the addition of instances of processes with no adverse effect to existing processes already executing in an application runtime environment. Scaling can be accomplished in the same manner using either a single server, or multiple server systems, eliminating the need for any special reconfiguration upon the addition of another server. In addition, use of SMTP for interprocess communications ensures that configuration and rescaling is identical whether the servers executing the processes are running on a single machine, or are distributed across the devices, assuming that each of the processes are reachable using SMTP.

Hence, the disclosed arrangement provides a robust, scalable and open standards based notification architecture that provides maximum flexibility for enterprise and solution provider systems having different needs. Various load balancing schemes may be utilized to determine whether a message source (e.g., the notification source 20 or the notification process 12) should output the corresponding SMTP based message to a selected duplicate process according to context independent factors (e.g., cycling through the duplicate instances or random selection), as opposed to context dependent load balancing, where a message source selectively supplies and SMTP based message to a selected duplicate process based on the destination user. In addition, multiple new instances of both notification servers and delivery servers can be started without needing to shut down any part of the existing notification system, providing a robust architecture with reliable service.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A notification method in a system having one or more server devices comprising:
   obtaining by one of the server devices of the system a notification message having been sent from a notification source according to a first open network protocol, the notification message specifying at least one notification recipient and notification information;
   accessing by the system a subscriber directory, according to a second open network protocol, for subscriber attribute information specifying subscriber notification preference for the specified at least one notification recipient;
   generating by the system, based on the subscriber notification preference, a notification delivery message that specifies a destination address of a corresponding notification device for the notification recipient; and
   outputting by the system the one notification delivery message to a selected corresponding one of a plurality of notification delivery processes for delivery of at least a portion of the one notification delivery message to the notification device according to a corresponding device protocol, at least one of the notification delivery processes includes multiple instances of the corresponding process, each instance configured for sending said at least a portion the one notification delivery message to the notification device according to the device protocol.

2. The method of claim 1, wherein the obtaining step includes retrieving the notification message from an Simple Mail Transfer Protocol (SMTP)-based mailbox configured for receiving e-mail messages as notification messages for notification subscribers.

3. The method of claim 2, wherein the accessing step includes accessing the subscriber directory according to Lightweight Directory Access Protocol (LDAP) as the second open network protocol for the subscriber attribute information.

4. The method of claim 2, wherein the retrieving step includes retrieving the notification message according to IMAP protocol as the first open network protocol.

5. The method of claim 1, wherein the outputting step includes outputting the notification delivery message according to SMTP protocol as a third open network protocol.

6. The method of claim 1, further including selecting one of the instances as the selected one notification delivery process by accessing a table configured for storing SMTP addresses assigned to the respective instances of the corresponding process.

7. The method of claim 1, further including selecting one of the instances as the selected one notification delivery process based on the specified at least one notification recipient.

8. The method of claim 1, wherein the outputting step includes outputting the at least one notification delivery message according to SMTP protocol as a third open network protocol.

9. The method of claim 1, wherein the outputting step includes outputting the notification delivery message that relates to one of an e-mail message, an SMS based message, a facsimile transmission, a message waiting indicator, a paging command, and outgoing call to a telephone.

10. A method for deployment of a notification system having one or more server devices for a notification source, the method comprising the steps of:

first initiating by one of the server devices multiple notification processes, each notification process configured for retrieving according to a first open network protocol a corresponding notification message from a corresponding primary message store, each notification message specifying at least one corresponding notification recipient, each notification process configured for accessing a subscriber directory according to a second open network protocol for subscriber notification preference information for the at least one corresponding notification recipient and in response generating a corresponding notification delivery message that specifies a destination address of the corresponding notification device; and second initiating by one of the server devices multiple notification delivery processes, each delivery process configured for retrieving according to a third open network protocol a corresponding received notification delivery message from a corresponding secondary message store and supplying a corresponding notification to a subscriber device according to a corresponding device protocol based on the corresponding received notification delivery message.

11. The method of claim 10, wherein the supplying step includes supplying the corresponding notification as one of an e-mail message, an SMS based message, a facsimile transmission, a message waiting indicator, a paging command, and outgoing call to a telephone.

12. The method of claim 10, wherein the first initiating step includes supplying each notification process with a corresponding retrieval address for the retrieval of the corresponding notification message from the corresponding primary message store.

13. The method of claim 12, wherein the second initiating step includes supplying each notification delivery process with a corresponding retrieval address for the retrieval of the corresponding notification delivery message from the corresponding secondary message store.

14. The method of claim 13, further comprising:
third initiating another instance of the notification process; and
providing the notification source with destination address information for providing notification messages to a primary message store accessible by the another instance of the notification process.

15. The method of claim 10, wherein the first open network protocol and the third open network protocol each is IMAP protocol.

16. The method of claim 10, wherein the second open network protocol is LDAP protocol.

17. A notification system comprising:
means for obtaining a notification message having been sent from a notification source according to a first open network protocol, the notification message specifying at least one notification recipient;
means for accessing a subscriber directory, according to a second open network protocol, for subscriber attribute information specifying subscriber notification preference for the specified at least one notification recipient;
means for generating, based on the subscriber notification preference, a notification delivery message that specifies a destination address of a corresponding notification device for the notification recipient; and
means for outputting, the one notification delivery message to a selected corresponding one of a plurality of notification delivery processes for delivery of at least a portion of the one notification delivery message to the notification device according to a corresponding device protocol, at least one of the notification delivery processes includes multiple instances of the corresponding process, each instance configured for sending the notification information to the notification device according to the device protocol.

18. The system of claim 17, wherein the one notification delivery message relates to one of an e-mail message, an SMS based message, a facsimile transmission, a message waiting indicator, a paging command, and outgoing call to a telephone.

19. The system of claim 17, wherein the obtaining means retrieves the notification message from an Simple Mail Transfer Protocol (SMTP)-based mailbox configured for receiving e-mail messages as notification messages for notification subscribers.

20. The system of claim 19, wherein the accessing means accesses the subscriber directory according to Lightweight Directory Access Protocol (LDAP) as the second open network protocol for the subscriber attribute information.

21. The system of claim 19, wherein the retrieving means retrieves the notification message according to IMAP protocol as the first open network protocol.

22. The system of claim 21, wherein the outputting means outputs the notification delivery message according to SMTP protocol as the third open network protocol.

23. The system of claim 17, wherein the outputting means selects one of the instances as the selecting one notification delivery process by accessing a table configured for storing SMTP addresses assigned to the respective instances of the corresponding process.

24. The system of claim 23, wherein the outputting means selects the one instance based on the specified at least one notification recipient.

25. The system of claim 17, wherein the outputting means outputs the at least one notification delivery message according to SMTP protocol as the third open network protocol.

26. A notification system having one or more server devices comprising:
a notification process configured for:
(1) obtaining by one of the server devices of the system a notification message having been sent from a notification source according to a first open network protocol, each notification message specifying at least one notification recipient,
(2) accessing by the system a subscriber directory according to a second open network protocol for subscriber notification preference information for the at least one notification recipient,
(3) generating by the system at least one notification delivery message that specifies a destination address of a corresponding notification device for the notification recipient based on the subscriber notification preference information, and (4) outputting by the system the at least one notification delivery message according to a third open network protocol; and
a plurality of notification delivery processes, each configured for delivering a notification to a subscriber device according to a corresponding device protocol based on a corresponding received notification delivery message.

27. The system of claim 26, wherein the at least one notification delivery message relates to one of an e-mail message, an SMS based message, a facsimile transmission, a message waiting indicator, a paging command, and outgoing call to a telephone.

28. The system of claim 26, wherein at least one of the notification delivery processes includes multiple instances of the corresponding process, each instance configured for sending the notification information to the notification device according to the device protocol.

29. The system of claim 26, wherein the notification process is configured for obtaining the notification message from an SMTP-based mailbox configured for receiving e-mail messages as notification messages for notification subscribers.

30. The system of claim 26, wherein the notification process is configured for obtaining the notification message from the SMTP-based mailbox according to IMAP protocol as the first open network protocol.

31. The system of claim 26, wherein the notification process is configured for accessing the subscriber directory according to LDAP protocol as the second open network protocol.

32. The system of claim 26, wherein the notification process is configured for outputting the at least one notification delivery message according to SMTP protocol as the third open network protocol.

33. The system of claim 26, further comprising a primary SMTP-based mailbox for receiving the notification message from the notification source, the notification process configured for periodically obtaining the notification message according to IMAP protocol.

34. The system of claim 33, further comprising secondary SMTP-based mailboxes configured for receiving the notification delivery messages for the respective notification delivery processes, each notification delivery process accessing its corresponding secondary SMTP-based mailbox for the corresponding notification delivery message.

35. The system of claim 34, further comprising:
a second notification process configured for obtaining a second notification message having been sent from the notification source according to the first open network protocol, and in response outputting a notification message to at least one of the notification delivery processes based on subscriber notification preference information retrieved from the subscriber directory; and
a second primary SMTP-based mailbox for receiving the second notification message from the notification source, the second notification process configured for periodically obtaining the notification message according to IMAP protocol.

36. The system of claim 26, further comprising a second notification process configured for obtaining a second notification message having been sent from the notification source according to the first open network protocol, and in response outputting a notification message to at least one of the notification delivery processes based on subscriber notification preference information retrieved from the subscriber directory.

37. A system for deployment of a notification system for a notification source, the system comprising:
a first server configured for first initiating multiple notification processes, each notification process configured for retrieving according to a first open network protocol a corresponding notification message from a corresponding primary message store, each notification message specifying at least one corresponding notification recipient, each notification process configured for accessing a subscriber directory according to a second open network protocol for subscriber notification preference information for the at least one corresponding notification recipient and in response generating a corresponding notification delivery message that specifies a destination address of the corresponding notification device; and
a second server configured for second initiating multiple notification delivery processes, each delivery process configured for retrieving according to a third open network protocol a corresponding received notification delivery message from a corresponding secondary message store and supplying a corresponding notification to a subscriber device according to a corresponding device protocol based on the corresponding received notification delivery message.

38. The system of claim 37, wherein the notification delivery message relates to one of an e-mail message, an SMS based message, a facsimile transmission, a message waiting indicator, a paging command, and outgoing call to a telephone.

39. The system of claim 37, wherein the first server supplies each notification process with a corresponding retrieval address for the retrieval of the corresponding notification message from the corresponding primary message store.

40. The system of claim 39, wherein the second server supplies each notification delivery process with a corresponding retrieval address for the retrieval of the corresponding notification delivery message from the corresponding secondary message store.

41. The system of claim 40, wherein the first open network protocol and the third open network protocol each is IMAP protocol.

42. The system of claim 37, wherein the second open network protocol is LDAP protocol.

43. A system for deployment of a notification system for a notification source, the system comprising:
first means for initiating multiple notification processes, each notification process configured for retrieving according to a first open network protocol a corresponding notification message from a corresponding primary message store, each notification message specifying at least one corresponding notification recipient, each notification process configured for accessing a subscriber directory according to a second open network protocol for subscriber notification preference information for the at least one corresponding notification recipient and in response generating a corresponding notification delivery message that specifies a destination address of the corresponding notification device; and
second means for initiating multiple notification delivery processes, each delivery process configured for retrieving according to a third open network protocol a corresponding received notification delivery message from a corresponding secondary message store and supplying a corresponding notification to a subscriber device according to a corresponding device protocol based on the corresponding received notification delivery message.

44. The system of claim 43, wherein the notification delivery message relates to one of an e-mail message, an SMS based message, a facsimile transmission, a message waiting indicator, a paging command, and outgoing call to a telephone.

45. The system of claim 43, wherein the first server supplies each notification process with a corresponding retrieval address for the retrieval of the corresponding notification message from the corresponding primary message store.

46. The system of claim 45, wherein the second server supplies each notification delivery process with a corresponding retrieval address for the retrieval of the corresponding notification delivery message from the corresponding secondary message store.

47. The system of claim 45, wherein the first open network protocol and the third open network protocol each is IMAP protocol.

48. The system of claim 43, wherein the second open network protocol is LDAP protocol.

* * * * *

UNITED STATES PATENT AND TRADEMARK OFFICE
CERTIFICATE OF CORRECTION

PATENT NO.      : 7,668,919 B2
APPLICATION NO. : 11/069961
DATED           : February 23, 2010
INVENTOR(S)     : Spielman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1392 days.

Signed and Sealed this

Twenty-eighth Day of December, 2010

David J. Kappos
*Director of the United States Patent and Trademark Office*